(12) United States Patent
Ondrus et al.

(10) Patent No.: US 6,309,304 B1
(45) Date of Patent: Oct. 30, 2001

(54) INTERNAL TORQUE LIMITER FOR A PARALLEL INDEXER

(75) Inventors: Joseph F. Ondrus; Dale A. Carlton, both of St. Louis, MO (US)

(73) Assignee: Crane Co., St. Louis, MO (US)

( * ) Notice: Subject to any disclaimer, the term of this patent is extended or adjusted under 35 U.S.C. 154(b) by 0 days.

(21) Appl. No.: 09/422,770

(22) Filed: Oct. 22, 1999

(51) Int. Cl.[7] .............................................. F16D 7/04
(52) U.S. Cl. ........................... 464/37; 464/39; 464/38; 192/56.62
(58) Field of Search ........................... 192/56.62; 464/37, 464/38, 39

(56) References Cited

U.S. PATENT DOCUMENTS

| | | |
|---|---|---|
| 1,136,739 | 4/1915 | Tiffany . |
| 1,541,489 | 6/1925 | Ely . |
| 1,566,553 | 12/1925 | Maisch . |
| 1,833,164 | 11/1931 | Jaenichen . |
| 2,300,778 | 11/1942 | Cornwall . |
| 2,746,691 | 5/1956 | Hoad . |
| 2,771,171 | 11/1956 | Schultz . |
| 2,818,712 | 1/1958 | Barnes et al. . |
| 2,885,873 | 5/1959 | Beeston, Jr. . |
| 2,943,216 | 6/1960 | Spodig . |
| 3,050,965 | 8/1962 | Landrum . |
| 3,053,365 | 9/1962 | Allen . |
| 3,148,499 | 9/1964 | Tringali . |
| 3,159,725 | 12/1964 | Dennis . |
| 3,221,389 | 12/1965 | Cowell . |
| 3,277,669 | 10/1966 | Woolley . |
| 3,339,819 | 9/1967 | Gollos . |
| 3,680,673 | 8/1972 | Webb . |
| 3,701,404 | 10/1972 | Cassell . |
| 3,722,644 | 3/1973 | Steinhagen . |
| 3,774,738 | 11/1973 | Steinhagen . |
| 3,817,116 | 6/1974 | Georgieff . |
| 3,866,728 | 2/1975 | Orwin . |
| 3,893,553 | 7/1975 | Hansen . |
| 3,927,537 | 12/1975 | Anderson et al. . |
| 3,930,382 | 1/1976 | Timtner . |
| 3,942,238 | 3/1976 | Dore . |
| 3,942,337 | 3/1976 | Leonard et al. . |
| 3,979,925 | 9/1976 | Kato . |
| 3,981,382 | 9/1976 | Bolliger . |
| 4,006,608 | 2/1977 | Vuceta . |
| 4,046,237 | 9/1977 | Root et al. . |
| 4,174,621 | 11/1979 | Woltjen . |
| 4,373,923 | 2/1983 | Kilwin . |
| 4,828,095 | 5/1989 | Kilwin . |
| 5,724,861 | * 3/1998 | Mang ..................................... 74/569 |
| 5,857,913 | * 1/1999 | Fujimura et al. ................. 192/56.62 |

* cited by examiner

Primary Examiner—Lynne H. Browne
Assistant Examiner—Aaron M Dunwoody
(74) Attorney, Agent, or Firm—Paul M. Denk

(57) ABSTRACT

A parallel indexer having a housing, an input shaft rotatably mounted in said housing, an output shaft rotatably mounted in said housing and extending exteriorly thereof, said input shaft and output shaft being arranged parallel to each other, said output shaft having a driven surface which mounts the plurality of roller gear drives thereon, and which are driven by at least one cam mounted upon the input shaft, said driven surface being normally fixed to the output shaft, and having a torque limiter arranged intermediate thereof and which when excessive torque is encountered, provides for disengagement between the driven surface and the output shaft, to disconnect the output for the parallel indexer.

5 Claims, 4 Drawing Sheets

INTERNAL TORQUE LIMITER FOR A PARALLEL INDEXER

BACKGROUND OF THE INVENTION

This invention relates to an internal overload clutch assembly which permits rotation between a rotating member and a rotatable member during normal operation, but which disconnects the rotating and rotatable members from each other when a maximum torque is exceeded.

In order to couple and uncouple drive shafts from driven shafts, a variety of styles of torque overload clutches or couplings have been developed. While prior art developments in torque overload clutches has been extensive, they can be generally described according to their construction and operation. Many of these clutch or coupling devices are in the category of flexible couplings which provide transmission of the driving, rotational, or torque force from a drive shaft to the intended driven shaft, but which are capable of disconnection when a binding force creates an excessive torque causing significantly reduced turning of a mechanical operator on a work component. In certain cases, the flexible couplings are provided with safety features which prevent excessive torque forces on the driven shaft from damaging the drive means and/or its prime mover. Many of the safety devices employed in flexible couplings include magnetically activated torque coupler devices as shown, for example, in U.S. Pat. No. 2,771,171. Another variety of magnetic coupling-clutch devices is shown in U.S. Pat. Nos. 3,221,389 and 3,339,819 which use mechanical elements that engage/disengage relative to one another, together with permanent magnets. Further types of magnetic torque limiting devices used in low force operating mechanisms, such as phonograph record players or sound recorders, are shown in U.S. Pat. Nos. 1,136,739 and 2,300, 778. Other types of magnetic couplers include those which have spring biasing to determine the degree of force necessary for disengaging the coupling as shown in U.S. Pat. No. 3,053,365. Other forms of connectors which have utilized permanent magnet designs for output shaft 31 can rotate relative to each other. The forward portion 53 of the hub 41 has an increased diameter to form a larger front surface 55. A series of holes 57 are formed in the hub's front surface 55.

In addition to magnetic coupler designs, various mechanical coupling devices, using ball detent couplings for holding driving and driven parts together until separated by excessive torque are shown in U.S. Pat. Nos. 3,701,404, 3,680, 673, 3,893,553, 3,981,382, 3,979,925, 3,942,238, 3,927,537, 3,930,382 and 3,866,728. Some mechanical coupling devices employ ball-bearing type means as the coupling/ uncoupling element such as shown in U.S. Pat. Nos. 1,833, 164, 3,722,644 and 3,774,738. Other types of power transmitting mechanisms having flexible couplings therein are shown in U.S. Pat. Nos. 1,541,489, 1,566,553, 2,818,712, 3,050,965, 3,148,499, 3,942,337, 4,006,608 and 4,046,237.

Along With the aforementioned categories, there is yet another category which has been developed by inventors employed by the assignee of the present invention. In U.S. Pat. Nos. 4,174,621 and 4,373,923, this particular type of mechanical torque limiting overload coupling/clutching device has been disclosed. In both of these patents, an improved overload torque coupler/clutch device has been developed in which suspended ball detents are used to interconnect rotating and rotatable members during normal operation, but upon encountering an excessive torque force on the rotatable member, suspended ball detents are shifted against a resilient spring out of seating engagement to disconnect the rotating and rotatable members. This improved style of torque limiting overload coupling minimizes rotational back lash or looseness, while maintaining precision operation of the rotatable member. In addition, a more precise and consistent de-coupling of the assembly is provided when a trip torque is encountered, and significant damage to the ball detents has been minimized. Such torque limiting overload coupling devices have been particularly useful in conjunction with cam indexing systems such as shown in U.S. Pat. No. 3,817,116, for example, which is also assigned to the same assignee of the present invention. The construction and operation of such cam operation systems include the use of radially mounted cam followers which are indexed by specifically designed multi-ribbed cams. The cam surfaces engage cam followers mounted on a hub to provide accurate positioning, while allowing clearance between adjacent cam followers. Mechanical torque limiting overload couplings which have been employed in conjunction with such cam indexing systems, have been operated as separate components, separate from, but operative with such systems. Thus, a typical set up would include a cam index system, with or without a separate speed reducer, and also a separately mounted torque limiting overload coupling which is mounted outside the housing of the cam index system, but which couples/uncouples the output driven shaft or flange thereof, to connect and disconnect the drive shaft or prime mover when an excessive torque is encountered.

In certain industries, however, it is necessary to expose all of the aforementioned mechanical components and driving systems to daily cleaning. This subjects the operating machine components to unnecessary exposure to moisture and deterioration, even though stainless steel may be used in the construction thereof. This has created a need for a self enclosed torque limiting clutch assembly which is contained in the same housing as the indexing system or prime mover. While it may appear at first sight that this would not require extensive engineering design and improvement in view of the highly developed nature of the prior art in this field, in actual fact; however, the development of the present invention did not come easily. Numerous designs were conceived and tested, some including magnetic coupler devices, but were unsuccessful. After much development and testing the internal overload clutch assembly of U.S. Pat. No. 4,828, 095, which is also assigned to the same assignee of the present invention and which is incorporated herein by reference, was developed. The overload clutch assembly of that patent, however, was developed for use with a right angle indexer. There, however, is a need for an internal overload clutch assembly which can be used in parallel shaft indexers.

BRIEF SUMMARY OF THE INVENTION

This invention contemplates the parallel indexer having a housing, an input shaft rotatably mounted in said housing, an output shaft rotatably mounted in said housing and extending exteriorly thereof, said input shaft and output shaft being arranged parallel to each other, said output shaft having a driven surface which mounts the plurality of roller gear drives thereon, and which are driven by at least one cam mounted upon the input shaft, said driven surface being normally fixed to the output shaft, and having a torque limiter arranged intermediate thereof and which when excessive torque is encountered, provides for disengagement between the driven surface and the output shaft, to disconnect the output for the parallel indexer.

The principal object of this invention is to provide a parallel indexer, having an input shaft and output shaft that are arranged parallel to each other during the operation of the indexer.

Another object of this invention is to provide a torque limiter operatively associated within the output shaft, and which provides for disengagement when excessive torque is encountered, thereby discontinuing the rotations of the output shaft, notwithstanding the continued operations of the input drive.

These and other objects will become more apparent to those skilled in the art upon reviewing the subject matter of this invention, in light of the description of the preferred embodiment, in view of the drawings.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes what we presently believe to be the best mode of carrying out the invention.

Figure 1:
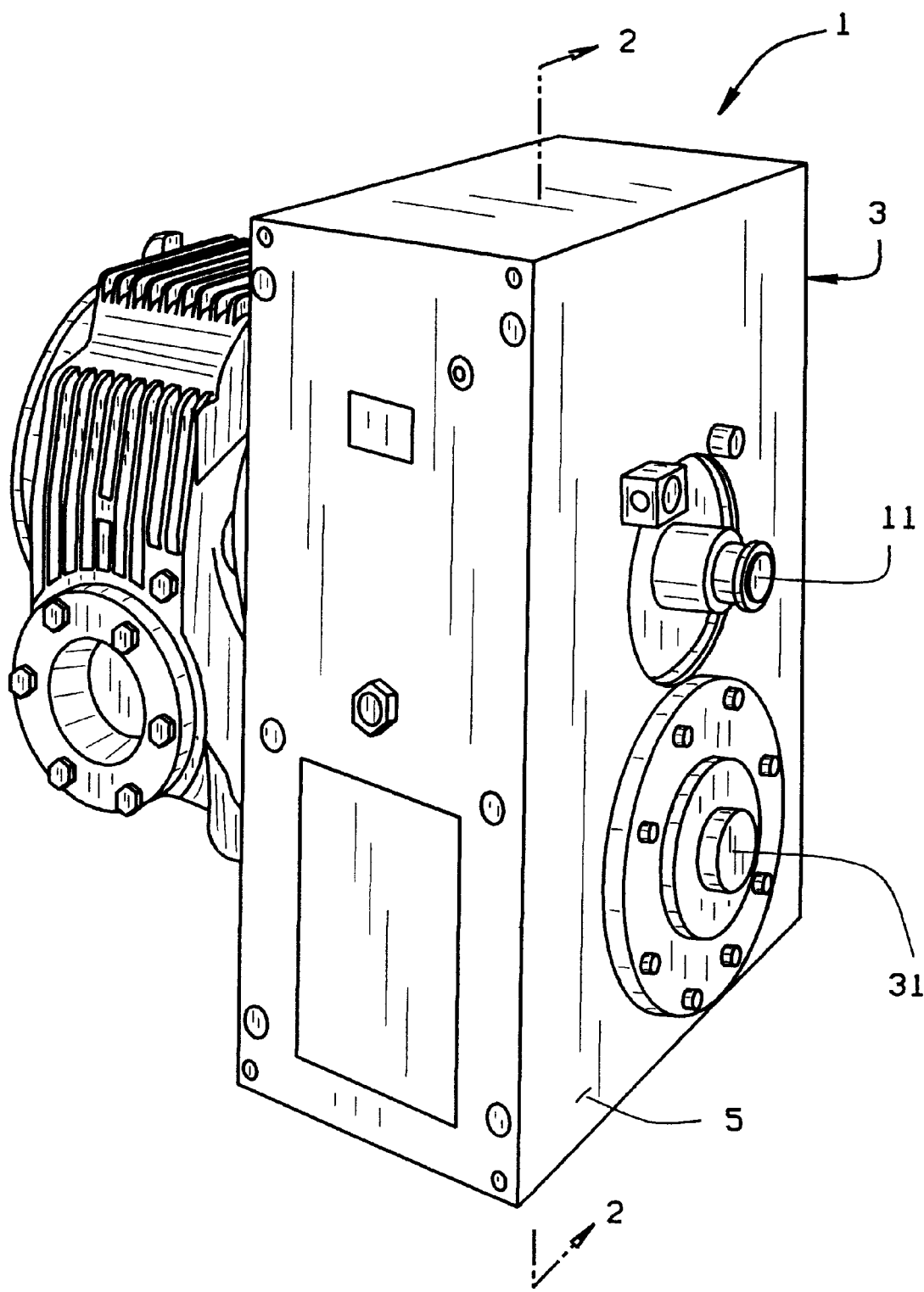
FIG. 1 is a perspective view of a parallel shaft indexer which includes an internal overload assembly of the present invention.
Figure 2:
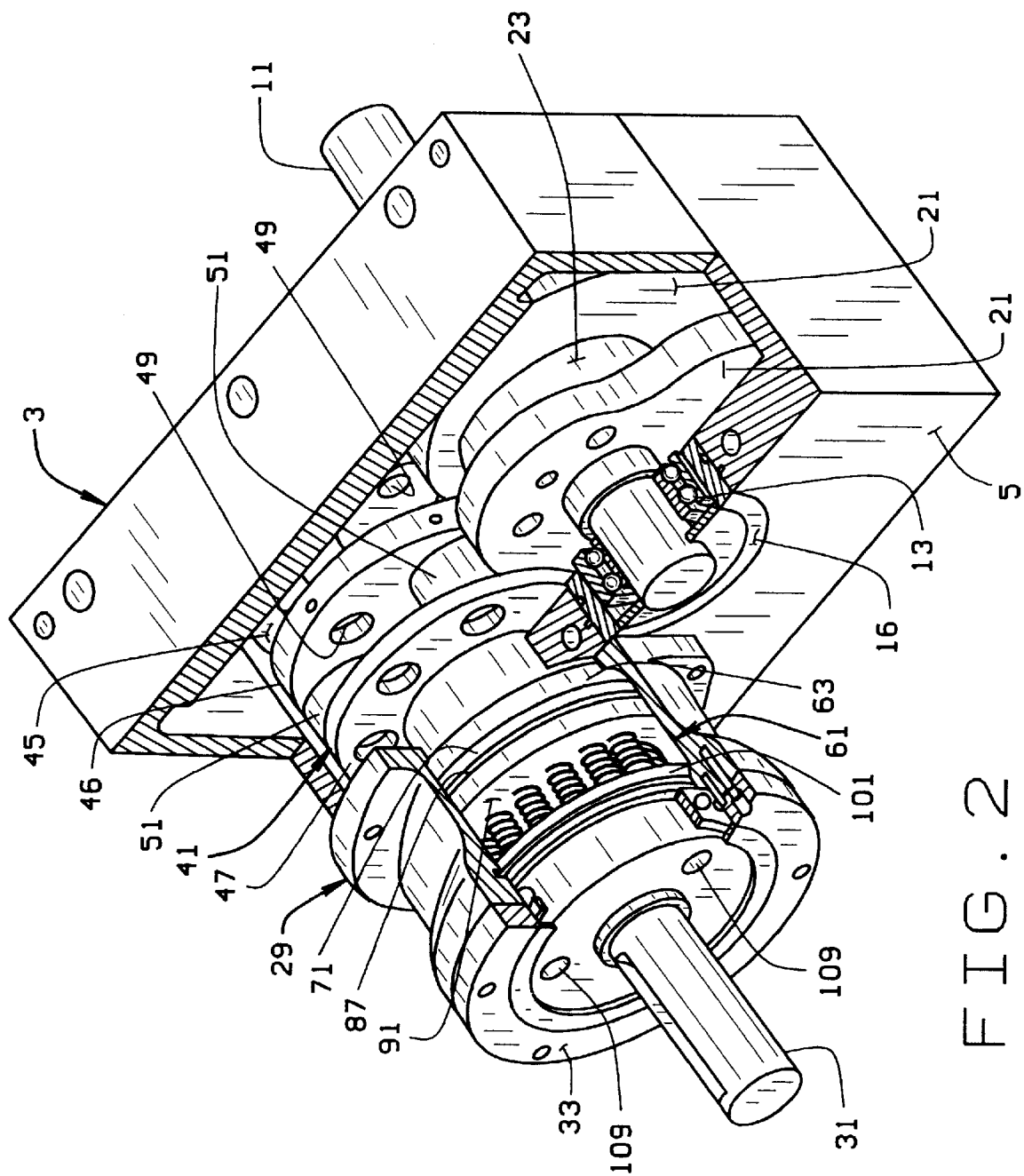
FIG. 2 is a side elevational view, partly in section, showing the combined prime mover/internal overload assembly construction of the present invention as taken along lines 2—2 of FIG. 1.
Figure 3:
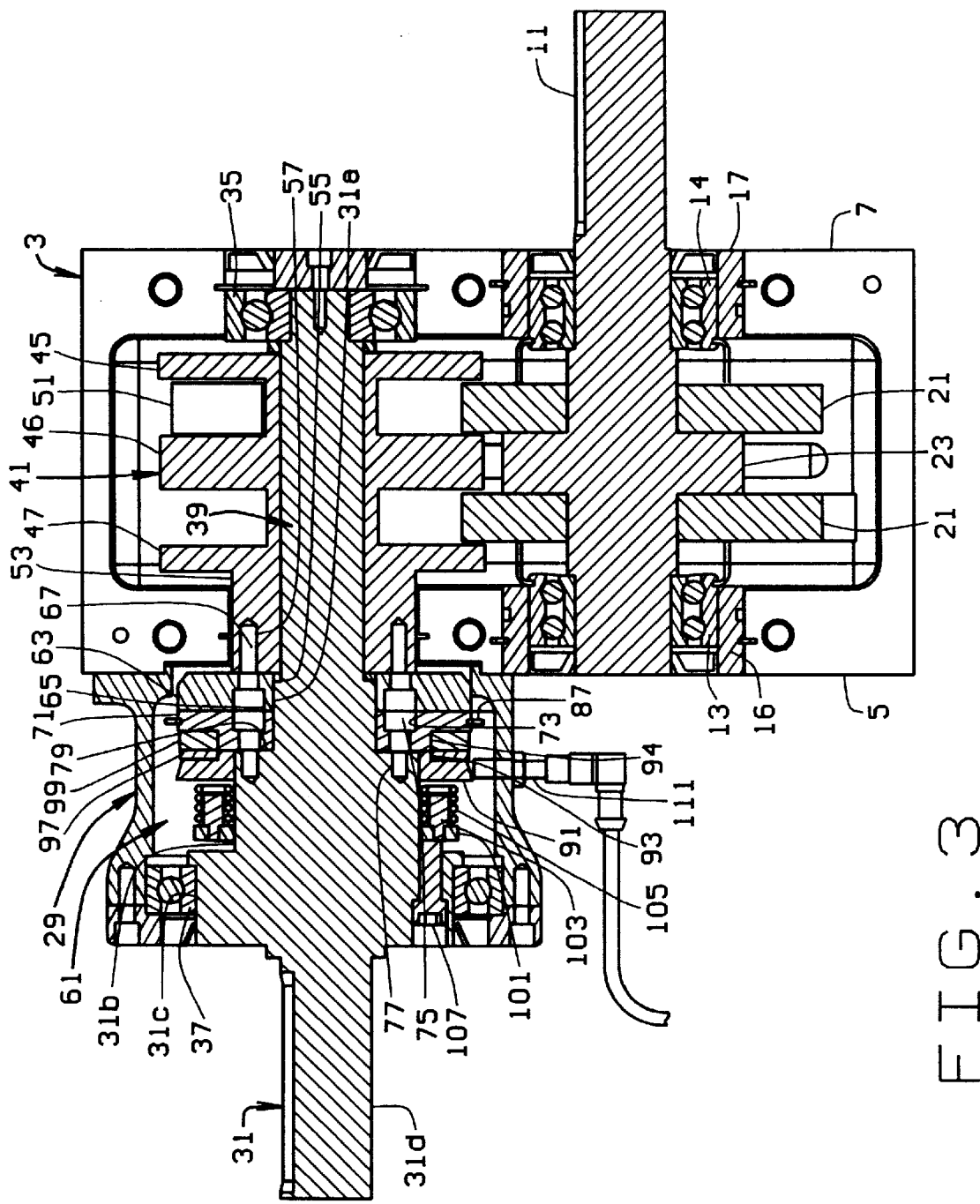
FIG. 3 is a cross-sectional view of the indexer taken along line 2—2 of FIG. 1.
Figure 4:
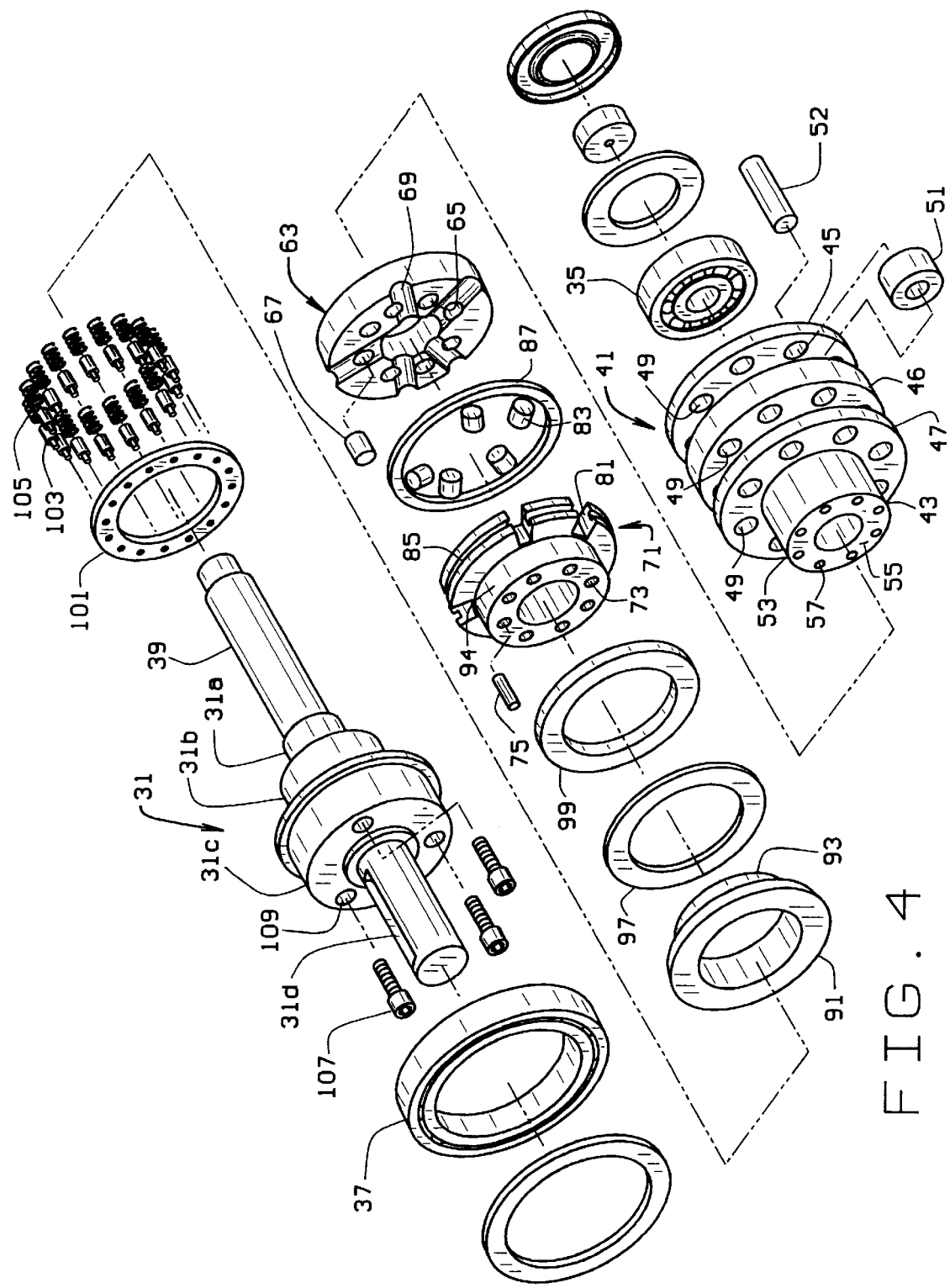
FIG. 4 is an exploded perspective view of the internal overload assembly of the present invention.

A parallel indexer 1 is shown generally in FIG. 1. The indexer 1 includes a housing 3 having a front face 5 and a back face 7. An input shaft 11 extends rearwardly from back face 7 to be connected to a prime mover (not shown), such as an electrical motor, which rotates the input shaft 11. The input shaft 11 is rotatably journaled in front and rear bearing assemblies 13, 14 which, in turn are mounted in front and rear bushings 16 and 17. A pair of cams 21 are mounted on the input shaft 11 within the housing 3. The cams 21 are spaced apart by a spacer 23 which is integral with the shaft 11. The cams 21 are rotationally fixed to the input shaft 11 to rotate with the shaft as the shaft 11 is rotated by the prime mover.

A torque limiter housing 29 is mounted to the housing front face 5. An output shaft 31 extends from the housing back face 7, through the housing 3 and the torque limiter housing 29 to extend out the front 33 of the torque limiter housing 29. The output is rotatably journaled in rear bearing assembly 35 mounted in the back face 7 of the housing 3 and a front bearing assembly 37 mounted in the front 33 of the torque limiter housing 29. The output shaft 31 has a first portion 39 which is journaled in the back bearing assembly 35 and extends the width of the housing 3. In the torque limiter housing 29, the output shaft 31 is stepped at 31a, 31b, and 31c to form sections of increasing diameter. Externally of the torque limiter housing 29, the output shaft 31 is stepped down as at 31d to be a similar diameter as the first section 39.

A hub 41 is mounted on the output shaft first section 39. The hub 41 includes a sleeve 43 from which three plates 45, 46, and 47 extend. The plates 45–47 each have a series of holes 49 extending around the periphery of the plates. The holes 49 of the plates 45–47 are aligned with each other. Rollers 51 are mounted between plates 45 and 46 and between plates 46 and 47. The rollers 51 are rotatably mounted on rods 52 which extend through the aligned holes 49 of the plates 45–47. The input and output shafts 11 and 31 are positioned relative to each other so that the cams 21 extend into the space between the plates 45–47 so that the cams 21 will engage the rollers 51 as the cams are turned by the rotating action of the input shaft. When the cams 21 do engage the rollers 51, the rollers 51 are pushed by the cams 21 to cause the hub 41 to rotate about its axis. The hub sleeve 43 is not fixed to the output shaft first section 39, and, as will be discussed below, the hub 41 and output shaft 31 can rotate relative to each other. The forward portion 53 of the hub 41 has an increased diameter to form a larger front surface 55. A series of holes 57 are formed in the hub's front surface 55.

A torque limiter 61 is contained within the torque limiter housing 29. The torque limiter 61 is fully enclosed in the housing 3 and the torque limiter housing 29. Thus, the indexer 1 can be used in environments in which exposed limiters cannot be used, such as environments in which the limiters would require extensive cleaning to remain operational or to continue to be used for a specific purpose.

The torque limiter includes a drive plate 63 which is positioned about the output shaft portion 31a to be adjacent with the hub front surface 55. The drive plate 63 includes a series of pin holes 65 which extend through the plate. The pin holes 65 of the drive plate are alignable with the holes 57 in the front surface 55 of the hub 41. Pins 67 are passed through the drive plate pin holes 65 and into the hub holes 57 to rotationally fix the drive plate 63 relative to the hub 41. Thus, as the hub 41 is rotated by the cams 21, the drive plate 63 will also rotate. The drive plate 63 also includes a series of seats or detents 69 around the periphery of the plate. The seats 69 are preferably radially extending in plan and semi-circular in cross-section. The seats 69 are not regularly spaced about the drive plate 63.

A driven plate 71 is positioned adjacent the drive plate 63 around the output shaft section 31a. The driven plate 71 includes a series of pin holes 73 which accept pins or dowels 75. The pins 75 extend into holes 77 in the rear face 79 of the output shaft section 31b. The drive plate 71 also includes a plurality of slots 81 which extend radially inwardly from the outer edge of the driven plate. The driven plate slots 81 are not evenly spaced about the edge of the driven plate 71. However, the drive plate seats 69 and the driven plate slots 81 are alignable with each other. Thus, for each driven plate slot 81, there is a corresponding drive plate seat 69. A roller 83 is received in each driven plate slot 81. The driven plate 71 has a circumferential slot 85 which receives a lock ring 87 or the like to hold the rollers 83 in the driven plate slots 81. The rollers 83 are sized, such that they are also seated in the drive plate seats 69. The engagement of the rollers 83 with the drive plate 63 is such that, as the drive plate 63 is rotated, the drive plate 63 will rotate the driven plate 71. Because the driven plate 71 is rotationally fixed to the output shaft 31, the rotation of the driven plate 71 by the drive plate 63 will cause the output shaft to rotate.

A switch flange 91 is positioned about the output shaft section 31b. The switch flange 91 and the driven plate 71 each form seats 93 and 94 on which a thrust washer 97 and a thrust bearing 99 are positioned. A compression ring 101 is mounted around the output shaft section 31b. The compression ring 101 includes a plurality of posts 103 on which spiral springs 105 are mounted. The springs 105 press against the switch flange 91. Three adjusting screws 107 extend through openings 109 in the front face of the output shaft section 31c to engage the compression ring 101. The screws 107 can be adjusted to alter the load force applied by the springs 105 on the switch flange 91.

In operation, the input shaft 11 and cams 21 are rotated by the prime mover. The rollers (or followers) 51 on the hub 41 are engaged by the cams 21, and the rotation of the cams causes the hub 41 to incrementally rotate about the output shaft first section 39. The drive plate 63 of the torque limiter 61 is fixed to the hub 41, and hence rotates about the output shaft 31 with the hub 41. The driven plate 71 is separate from the drive plate 63 and its rollers 83 engage the seats 69 of the drive plate 63. The compression load of the springs 105 load the switch flange 91, which in turn loads the thrust washers 97 and thrust bearings 99. This force is applied directly to the rollers 83 keeping them in the drive plate seats 69. Thus, the driven plate 71, and hence the output shaft 31, is rotated by the drive plate 63. When a set torque is exceeded, the rollers 83 will overcome the force of the springs 105, and will become disengaged from the drive plate seats 69. Thus, the driven plate 71 and the drive plate 63 will be disengaged from each other. When this occurs, the driven plate 71 and the output shaft 31 will cease to rotate. However, the input shaft 11, the cams 21, and the hub 41 will continue to rotate.

The compression load of the springs 105 determines the torque capacity of the limiter or clutch 61. As noted above, the load of the springs 105 (and hence the torque capacity of the limiter) can be set or adjusted by turning the adjusting screws 107 in equal increments. As the adjusting screws 107 move, the compression ring 101 moves axially along the output shaft 31. The springs 105 are trapped between the compression ring 101 and the switch flange 91. Therefore, the movement of the compression ring 101 (due to adjustment of the screws 107) changes the spring load, and thus the torque capacity of the unit.

The indexer 1 also includes a switch assembly 111 which is responsive to movement of the switch flange 91. The switch assembly cab be in electrical communication with the prime mover, and when activated, causes the prime mover to be turned off. When the torque limit of the unit is exceeded, the driven plate rollers 83 will come out of the drive plate seats 69 to disengage the driven plate 71 from the drive plate 63. When this occurs, the rollers 83 will move axially in the driven plate slots 81. The rollers 83 are adjacent the switch flange 91, and the movement of the rollers, as they become disengaged from the drive plate seats 69, will cause the switch flange 91 to move axially away from the drive plate 63. The change in position of the switch flange 91 will cause the switch assembly 111 to activate, and the prime mover will cease operations.

As noted above, the driven plate slots 81 and the drive plate seats 69 are irregularly spaced around the driven plate 71 and the drive plate 63, respectively. Thus, when the drive plate 63 and driven plate 71 are disengaged from each other by a torque overload condition, it will require a full revolution of the drive plate 63 before the drive plate 63 and driven plate 71 are again engaged with each other. The limiter will automatically be reset when the driven plate rollers 83 are again received in the drive plate seats 69.

As various changes could be made in the above constructions without departing from the scope of the invention, it is intended that all matter contained in the above description or shown in the accompanying drawings shall be interpreted as illustrative and not in a limiting sense. For example, the spiral springs 105 can be replaced with other types of resilient members which will apply a load to the rollers 83. For example, a spring washer could be used. Even an annular foam ring could be used, as long as the foam is resilient. Balls could be used in place of the rollers. The drive plate 63 could be integrally formed with the hub 41. Similarly, the driven plate could be integrally formed with the output shaft 31. These examples are merely illustrative.

What is claimed is:

1. A parallel indexer having:

a housing;

a input shaft rotatably mounted in said housing;

a cam on said input shaft, said cam rotating with rotation of the input shaft;

a cam follower assembly rotatably mounted in said housing adjacent said input shaft; said cam follower assembly being rotated by said cam; said cam follower assembly including a hub having a sleeve, a pair of flanges extending from said sleeve, and a plurality of rollers extending between said hub flanges; said cam engaging said rollers to rotate said cam follower assembly;

a drive surface which rotates with said hub; said drive surface having a plurality of seats irregularly staggered around the drive surface;

an output shaft rotatably mounted in the housing and having an output end extending from the housing; said output shaft being parallel to said input shaft;

a driven surface which rotates with the output shaft; the driven surface including a plurality of seats irregularly staggered around the driven surface; the driven surface seats being alignable with the drive surface seats; rollers mounted in said driven surface seats; the rollers being received in the drive surface seats;

a resilient member mounted about said output shaft so as to apply a spring force to the rollers to maintain the driven surface rollers in the drive surface seats; whereby, rotation of the hub and the drive surface rotates the driven surface, and hence the output shaft, and whereby, when an specified torque is exceeded, the rollers will disengage from the drive surface seats to disengage the output shaft from the hub.

2. A parallel indexer having:

a housing;

a input shaft rotatably mounted in said housing;

a cam on said input shaft, said cam rotating with rotation of the input shaft;

a cam follower assembly rotatably mounted in said housing adjacent said input shaft; said cam follower assembly being rotated by said cam; said cam follower assembly including a hub having a sleeve, a pair of flanges extending from said sleeve, and a plurality of followers extending between said hub flanges; said cam engaging said followers to rotate said cam follower assembly;

a drive surface which rotates with said hub; said drive surface having a plurality of seats irregularly staggered around the drive surface;

an output shaft rotatably mounted in the housing and having an output end extending from the housing; said output shaft being parallel to said input shaft;

a driven surface which rotates with the output shaft; the driven surface including a plurality of seats irregularly staggered around the driven surface; the driven surface seats being alignable with the drive surface seats; followers mounted in said driven surface seats; the followers being received in the drive surface seats;

a resilient member mounted about said output shaft so as to apply a spring force to the followers to maintain the driven surface followers in the drive surface seats; whereby, rotation of the hub and the drive surface rotates the driven surface, and hence the output shaft, and whereby, when an specified torque is exceeded, the followers will disengage from the drive surface seats to disengage the output shaft from the hub.

3. The parallel indexer of claim 2 wherein the followers are substantially circular in cross-section.

4. The parallel indexer of claim 3 wherein the followers are rollers.

5. The parallel indexer of claim 2 wherein the followers are rotatably mounted between said hub flanges.

* * * * *